US009374470B2

(12) United States Patent
Gisby et al.

(10) Patent No.: US 9,374,470 B2
(45) Date of Patent: *Jun. 21, 2016

(54) METHOD AND SYSTEM FOR ENHANCED CONFERENCE CALL SECURITY

(71) Applicant: BLACKBERRY LIMITED, Waterloo (CA)

(72) Inventors: Douglas Michael Gisby, Rolling Meadows, IL (US); Brian Edward Anthony McColgan, Mississauga (CA); Christopher Labrador, Waterloo (CA); Kevin Wilfred Andrewin, Elgin, IL (US); Nicholas Patrick Alfano, Warwickshire (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,532

(22) Filed: Oct. 3, 2014

(65) Prior Publication Data
US 2015/0023487 A1  Jan. 22, 2015

Related U.S. Application Data

(63) Continuation of application No. 12/651,604, filed on Jan. 4, 2010, now Pat. No. 8,867,720.

(51) Int. Cl.
*H04M 3/42* (2006.01)
*H04M 11/00* (2006.01)
(Continued)

(52) U.S. Cl.
CPC .............. *H04M 3/56* (2013.01); *H04L 63/104* (2013.01); *H04L 63/107* (2013.01);
(Continued)

(58) Field of Classification Search
CPC .................. H04M 1/274575; H04M 1/72586; H04M 2203/60; H04M 2203/2072;

(56) References Cited

U.S. PATENT DOCUMENTS 5,544,321 A * 8/1996 Theimer ................. G06F 21/35
380/258
5,555,376 A * 9/1996 Theimer ................. G06F 21/35
709/229
(Continued)

FOREIGN PATENT DOCUMENTS

CA     2725496 A1  7/2011
EP     1631103 A1  3/2006
(Continued)

OTHER PUBLICATIONS

Extended European Search Report dated Jul. 15, 2010, issued in European Application No. 10150037.9, (7 pages).
(Continued)

*Primary Examiner* — Khai N Nguyen
(74) *Attorney, Agent, or Firm* — Fish & Richardson P.C.

(57) ABSTRACT

A method for controlling access by of communication devices to a conference call, the method comprising associating proximity settings with a conference call, the proximity settings indicating a acceptable proximity of other communication devices relative to a selected communication device; sensing by the selected communication device proximity of the other devices within its proximity of the communication device to obtain proximity information; and determining, by a processor, from the obtained proximity information and the proximity settings an action to be performed with reference to the conference call.

24 Claims, 13 Drawing Sheets

(58) Field of Classification Search
CPC ............ H04M 2203/2094; H04M 2203/5054;
H04M 2250/62; H04M 3/42; H04M 3/4234;
H04M 3/42221; H04M 3/42246; H04M
3/42348; H04M 3/4931; H04M 3/56; H04M
3/562; H04M 3/563; H04M 3/564; H04M
3/565; H04M 3/566; H04M 3/567; H04M
3/568; H04M 7/006; H04M 7/15; H04M
7/146; H04M 7/1235; H04M 1/72572; H04M
2201/40; H04M 2250/52; H04M 3/4936;
H04M 3/5191; H04L 12/18; H04L 12/1813;
H04L 12/581; H04L 63/10; H04L 63/104;
H04L 63/107; H04L 65/1053; H04L 65/403;
H04L 67/24; H04L 63/102; H04L 63/105;
H04L 65/4038; H04L 65/4084; H04L
65/4092; H04L 65/602; H04L 65/604; H04L
65/607; H04W 12/08; H04W 4/02; H04W
4/06; H04W 4/08; G01S 5/0072; H04N
2007/145; H04N 5/272; H04N 7/14; H04N
7/141; H04N 7/142; H04N 7/144; H04N
7/147; H04N 7/148; H04N 7/15; H04N 7/152;
H04N 7/155; H04N 7/157; H04N 7/23206
USPC ........ 379/90.01, 93.01, 93.21, 157, 158, 188,
379/201.01, 202.01, 207.01, 26, 5.03;
370/259, 260, 261, 262; 455/414.1,
455/416, 566; 348/14.01, 14.02, 14.03,
348/14.04, 14.05, 14.06, 14.07, 14.08,
348/14.09, 14.1, 14.11, 14.12, 14.13, 14.14,
348/15.15, 14.16; 704/270
See application file for complete search history.

(51) Int. Cl.
| | |
|---|---|
| *H04M 1/00* | (2006.01) |
| *H04L 12/16* | (2006.01) |
| *H04Q 11/00* | (2006.01) |
| *H04M 3/38* | (2006.01) |
| *H04M 3/56* | (2006.01) |
| *H04L 29/06* | (2006.01) |
| *H04M 7/12* | (2006.01) |
| *H04W 12/08* | (2009.01) |
| *H04W 4/02* | (2009.01) |
| *H04W 4/08* | (2009.01) |

(52) U.S. Cl.
CPC ......... *H04L 65/1053* (2013.01); *H04L 65/403*
(2013.01); *H04M 3/42348* (2013.01); *H04W*
*12/08* (2013.01); *H04L 63/10* (2013.01); *H04M*
*3/38* (2013.01); *H04M 3/4234* (2013.01); *H04M*
*7/1235* (2013.01); *H04M 2203/2094* (2013.01);
*H04M 2203/60* (2013.01); *H04W 4/02*
(2013.01); *H04W 4/08* (2013.01)

(56) References Cited

U.S. PATENT DOCUMENTS

| | | | |
|---|---|---|---|
| 7,046,779 B2* | 5/2006 | Hesse ................. | H04L 12/1818 348/E7.084 |
| 7,202,798 B2 | 4/2007 | Harris | |
| 8,867,720 B2 | 10/2014 | Gisby et al. | |
| 8,897,435 B2* | 11/2014 | Gisby ...................... | H04M 3/38 370/260 |
| 2003/0154293 A1* | 8/2003 | Zmolek .................... | H04L 63/08 709/228 |
| 2003/0174826 A1* | 9/2003 | Hesse ................. | H04L 12/1818 379/210.01 |
| 2003/0216144 A1* | 11/2003 | Roese ........................ | G01S 5/02 455/456.1 |
| 2003/0217122 A1* | 11/2003 | Roese ........................ | G01S 5/02 709/219 |
| 2004/0047461 A1* | 3/2004 | Weisman .......... | H04M 3/42008 379/202.01 |
| 2005/0018827 A1* | 1/2005 | Himmel .............. | H04L 12/1813 379/202.01 |
| 2005/0130683 A1 | 6/2005 | Phang et al. | |
| 2006/0099965 A1* | 5/2006 | Aaron ................ | H04M 1/72572 455/456.3 |
| 2007/0036317 A1 | 2/2007 | Shaffer et al. | |
| 2007/0091906 A1 | 4/2007 | Croy et al. | |
| 2007/0120965 A1* | 5/2007 | Sandberg ................ | H04N 7/147 348/14.08 |
| 2008/0004002 A1 | 1/2008 | Chin et al. | |
| 2008/0055408 A1* | 3/2008 | Wun ................... | H04N 1/00103 348/122 |
| 2008/0160976 A1 | 7/2008 | Virolainen et al. | |
| 2008/0215682 A1* | 9/2008 | Vilis ..................... | H04L 63/101 709/204 |
| 2009/0003281 A1* | 1/2009 | Panabaker .............. | H04L 67/18 370/331 |
| 2009/0024601 A1* | 1/2009 | Zmolek .................... | H04L 63/08 |
| 2009/0322890 A1* | 12/2009 | Bocking ................ | G03B 17/00 348/211.2 |
| 2010/0029248 A1* | 2/2010 | Shi ........................ | H04W 12/08 455/411 |
| 2010/0081418 A1* | 4/2010 | Chiashi ............... | H04M 1/0241 455/414.1 |
| 2010/0130213 A1* | 5/2010 | Vendrow ........... | H04M 3/42374 455/445 |
| 2010/0177880 A1 | 7/2010 | Danielsen | |
| 2010/0227581 A1* | 9/2010 | Cook ................. | H04M 1/72577 455/404.1 |
| 2010/0269156 A1* | 10/2010 | Hohlfeld ............. | G06F 21/6218 726/4 |

FOREIGN PATENT DOCUMENTS

| | | |
|---|---|---|
| EP | 2341689 A1 | 7/2011 |
| WO | 2007051493 A1 | 5/2007 |

OTHER PUBLICATIONS

Canadian Office Action dated May 16, 2012, issued in Canadian Application No. 2,725,496, (3 pages).

Canadian Office Action dated Jul. 9, 2013, issued in Canadian Application No. 2,725,496, (3 pages).

Canadian Office Action dated May 21, 2014, issued in Canadian Application No. 2,725,496, (3 pages).

* cited by examiner

METHOD AND SYSTEM FOR ENHANCED CONFERENCE CALL SECURITY

CROSS REFERENCE TO RELATED APPLICATION

This application is a continuation application of U.S. Non-Provisional patent application Ser. No. 12/651,604, titled, "Method and System for Enhanced Conference Call Security", filed Jan. 4, 2010, now U.S. Pat. No. 8,867,720, the contents of which are hereby incorporated herein by reference in its entirety.

FIELD OF THE DISCLOSURE

The present disclosure relates to enterprise systems, and more specifically to a method and system for providing improved conference call security.

BACKGROUND

Conference calls have traditionally been a third party hosted service. However more recently conference call systems, both video and audio, have evolved to where enterprise users now have the freedom to conduct quick and secure conferences from any location or device without the need for third party conference initiators or administrators to set-up, schedule or moderate conference calls. These conference users have the flexibility to be reached on traditional PBX (Private Branch exchange) desk sets, VoIP (Voice over IP), WiFi, cellular, home office and even soft-phones. Nevertheless, despite this flexibility, security boundaries must still be managed for the conference call.

Managing who is on a conference call can be an important feature to ensure the call is conducted efficiently and within its security boundaries. These security boundaries traditionally included restrictions on the participants. While techniques for validation of participants are known. There are situations where even if the user is authorized, a company may not want an employee or conference call participant to participate in a conference call unless some other security criteria are satisfied.

For example if the conference call participant is using a speaker phone then others may be able to eavesdrop on the conversation if the participant is not in a secure location.

In conference calls with a long agenda, participants or the moderator may find it useful to know when individuals enter and leave a call in order to ensure that the appropriate people are present for specific agenda items. Similarly, in conference calls where a large number of people are in a room and on speakerphone with other participants, it can be difficult to know who is still in the room, as participants may enter and leave the room throughout the conference. Security may also become an issue if certain topics are only appropriate for a limited audience.

It is understood that absolute security may no be possible however there is still a need for a system and method to reduce security breaches in conference calls.

BRIEF DESCRIPTION OF THE SEVERAL VIEWS OF THE DRAWINGS

The present disclosure will be better understood with reference to the drawings in which.

DETAILED DESCRIPTION

Figure 1:
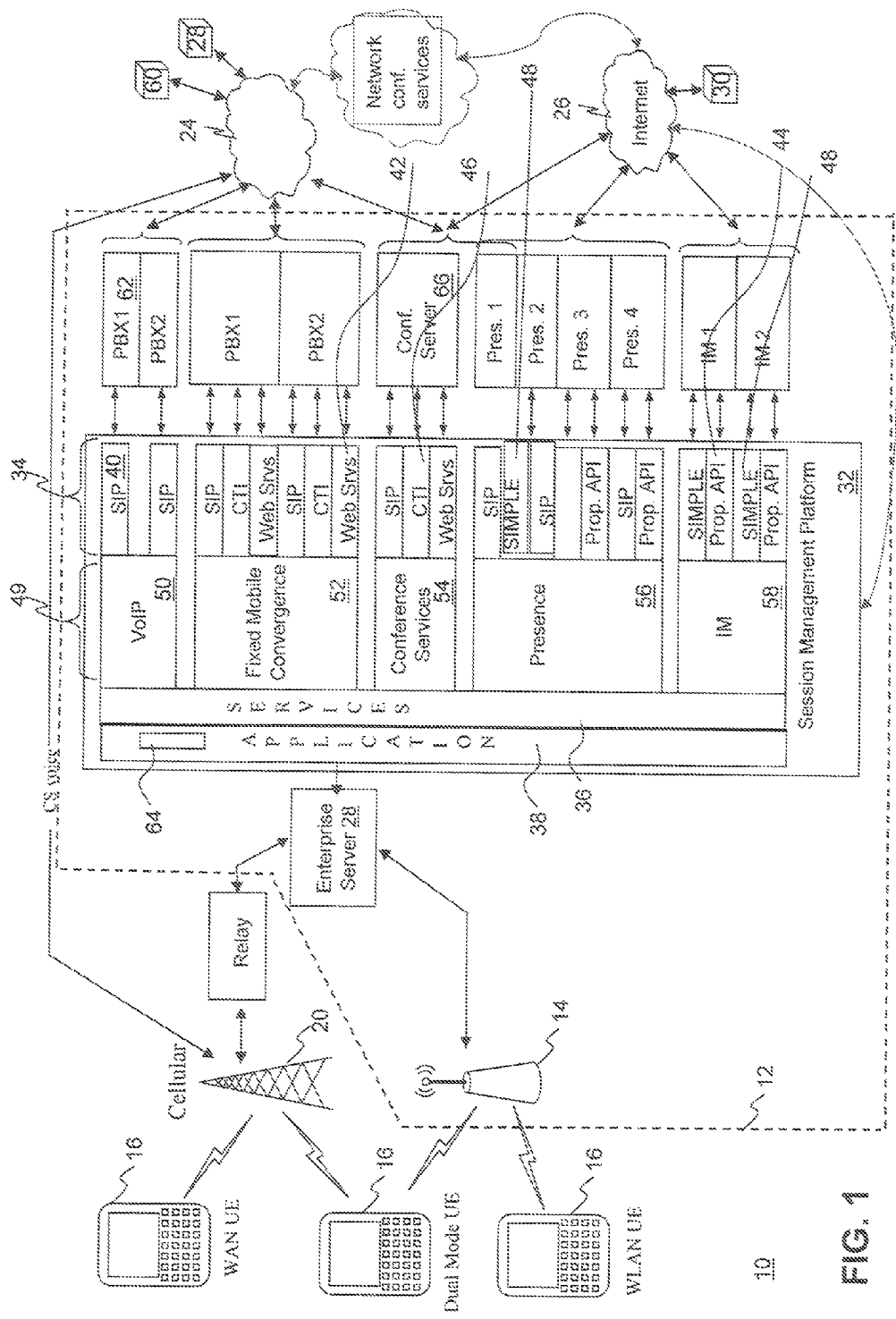
FIG. 1 is a schematic diagram showing an enterprise network in accordance with the present disclosure.

The present disclosure provides a method and system for improving conference call security, by implementing control on access by the communication device used by the participants in a conference call. Specifically, access control is based on the context of the device relative to access profiles, which are enforced by the system prior to the device being allowed to participate in the conference call and while the device is participating in the conference call.

Accordingly, the present disclosure provides a method for controlling access by of communication devices to a conference call, the method comprising associating proximity settings with a conference call, the proximity settings indicating a acceptable proximity of other communication devices relative to a selected communication device; sensing by the selected communication device proximity of the other devices within its proximity of the communication device to obtain proximity information; and determining, by a processor, from the obtained proximity information and the proximity settings an action to be performed with reference to the conference call.

The method of the present disclosure further provides for enforcing the proximity settings during the conference call. This can be done by periodically obtaining the proximity information or by having devices periodically transmit proximity information.

The present disclosure further provides a mechanism for a conference call planner to determine the proximity requirements.

In an embodiment, the proximity requirements may be defined in a policy document or profile. The profile may be set by the conference call moderator and/or by an authorized principal, and are based on a policy-type document that is either generated manually or through a user interface. In some instances, corporate governance/rules may provide a base policy document on which all created conference calls are based. This document could act as a template policy document that the conference call moderator/leader could modify to establish a conference (i.e., the restrictions can be set on a case-by-case basis). Additionally, the system may be able to restrict the moderator in terms of what policies they may establish.

In a still further embodiment there is provided a system device for controlling access of a communication device to a conference call, the device comprising a processor for: associating proximity settings with a conference call, the proximity settings indicating acceptable proximity of other communication devices relative to a communication device; sensing by the communication device proximity of said other devices within proximity of the communication device to obtain proximity information; and determining from the obtained proximity information and the proximity settings an action to be performed with reference to the conference call.

The present system and method is most advantageously implemented on a multi-layer platform provided in the architecture of an enterprise system, and is in communication with, among other things, a plurality of servers each configured for executing a corresponding application. The platform is configured for receiving and directing communications between application servers and a plurality of mobile devices.

Referring now to FIG. 1, a system for directing media and data streams is provided and generally designated 10. The system 10 includes an enterprise or business system 12 that contains a wireless network 14 in communication with at least one mobile device 16, such as a WLAN or dual mode communication device configured for communicating with the wireless network, as known in the art. The cellular network 20 is located outside of the enterprise 12 and is also in communication with at least one of the mobile devices 16, such as a WAN or dual mode communication device, as known in the art.

A Public Switched Telephony Network or PSTN 24 and an Internet network 26 are in communication with the enterprise 12, and more specifically are in communication with corresponding servers provided in the enterprise, as known in the art. The PSTN 24 is also in communication with at least one telephone communication device 28 and the Internet network 26 is in communication with at least one computer 30. However, it will be appreciated that the system 10 is not limited to the networks or devices described herein.

A platform (herein referred to as a Session Management Platform or SMP) 32 is provided within the enterprise 12 and is configured for enabling execution of a plurality of applications through the use of one of a plurality of protocols. The SMP 32 is configured to communicate with both the cellular network 20 and the wireless network 14 and, for security purposes, is preferably located behind a corporate firewall (not shown). More specifically, the SMP 32, among other things, takes in signaling from the mobile device 16, and instructs corresponding servers in the enterprise 12 how to direct the signaling to and from the mobile device, which will be described in further detail below. It is to be understood that the SMP 32 can either be a stand-alone server (as shown in FIG. 1 and as described in the present application), or it can be implemented into an existing control agent/server as a logical software component that enables the control agent to remotely control other servers (not shown).

Referring still to FIG. 1, the SMP 32 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication device and that leverage corresponding ones of the services and interface protocols for enabling the applications.

Specifically, the protocol layer 34 preferably includes protocols, which allow media to be controlled separate from data. For example, the protocol layer 34 can include, among other things, a Session Initiation Protocol or SIP 40, a Web Services protocol 42, an Application Programming Interface or API 44, a Computer Telephony Integration protocol or CTI 46, and a Session Initiation Protocol for Instant Messaging and Presence Leveraging Extensions or SIMPLE protocol 48. It is contemplated that the interface protocols 40-48 are plug-ins that can interface directly with corresponding servers in the enterprise 12, which will be further described below.

For the purposes of this disclosure, SIP 40 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 40 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP protocol 40 will be described in further detail below.

The SMP 32 also includes a plurality of the enablers 49 including, among other things, a VoIP enabler 50, a Fixed Mobile Convergence or FMC enabler 52, a conference services enabler 54, a presence enabler 56 and an Instant Messaging or IM enabler 58. Each of the enablers 50-58 is used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

Figure 2A:
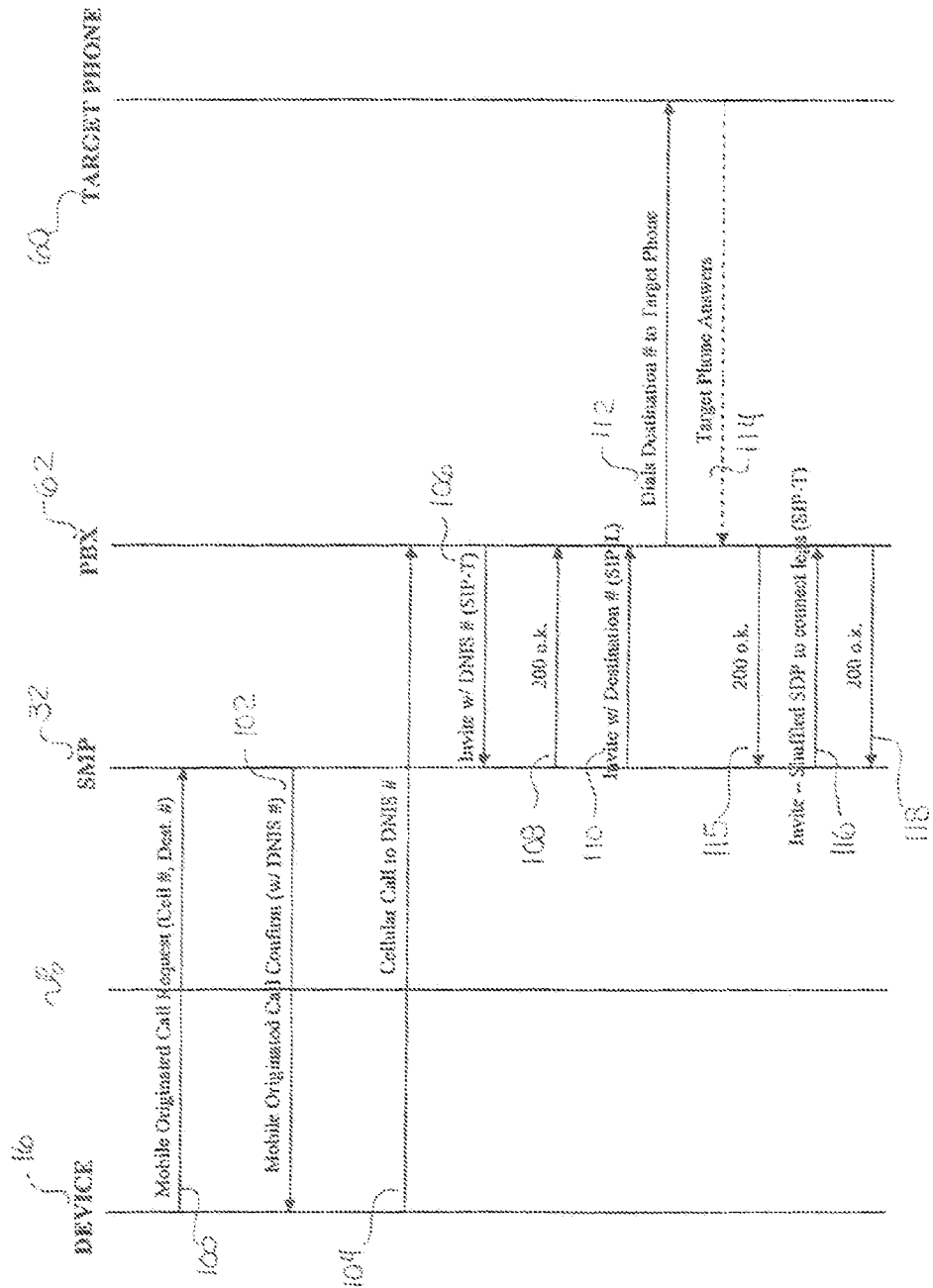
FIG. 2a is a signaling diagram generally indicating how mobile-originated, mobile-initiated calls are processed by the network of FIG. 1.

Turning now to FIGS. 2A-3B, the general operation of the system 10 using SIP 40 as the signaling protocol will be discussed, although it is recognized that the present system is not limited to the processes discussed herein. FIG. 2a provides a signaling diagram for a call originating from one of the mobile devices 16 to a target phone 60 connected to a Private Branch Exchange Server or PBX 62 provided within the enterprise 12. First, the device 16 sends a mobile originated call request with its cellular number and the destination number of the target phone 60 through the enterprise server 28 to the SMP 32 (block 100). The SMP 32 confirms the call request by sending the DNIS(dialed number identification service) number to the device (block 102). Next, the device 16 makes a cellular call using the DNIS number, which is received by the PBX 62 (block 104). As the DNIS has been configured in the PBX 62 to be routed to the SMP 32 via SIP-T, in response to the incoming call, the PBX 62 sends an invite over SIP-T with the DNIS number to the SMP 32 (block 106). The SMP 32 matches the incoming call with the expected call from the mobile, and if correct, acknowledges the invite by sending a 200 o.k. signal to the PBX, indicating that the mobile call leg is established (block 108).

The SMP 32 then sets up the outgoing call leg to the destination. It does this by sending an invite over SIP-L to the PBX 62 with the destination number of the target phone (block 110). SIP-L is used so that the call can be correctly attributed to the individual within the organization within any call records that are being maintained by the PBX 62. When the invite is received, the PBX 62 dials the destination number to the target phone 60 (block 112), and the target phone answers the call (block 114). When the target phone is answered, the PBX sends a 200 o.k. signal to the SMP 32 indicating that the target phone is ready to receive data (block 115). The SMP 32 then sends an invite over SIP-T to the PBX 62 and shuffles the SDP (Session Description Protocol, as known to those of ordinary skill in the art) to connect the call legs (block 116). When the call legs are connected, the PBX 62 sends a second 200 o.k. signal block 164 to the SMP 32 (block 118), and the users of the device 16 and target phone 60 can communicate with each other.

Note that between the cellular call leg being established and the outgoing call leg being answered, the mobile user hears ringing tones. These ringing tones may be provided by the PBX 62 using the presentation of early media from the outgoing call leg, or they may be generated locally on the device if early media is not available. In the latter case, it will be necessary to localize the ringing tone to match the tone normally heard with a call through the PBX 62.

Figure 2B:
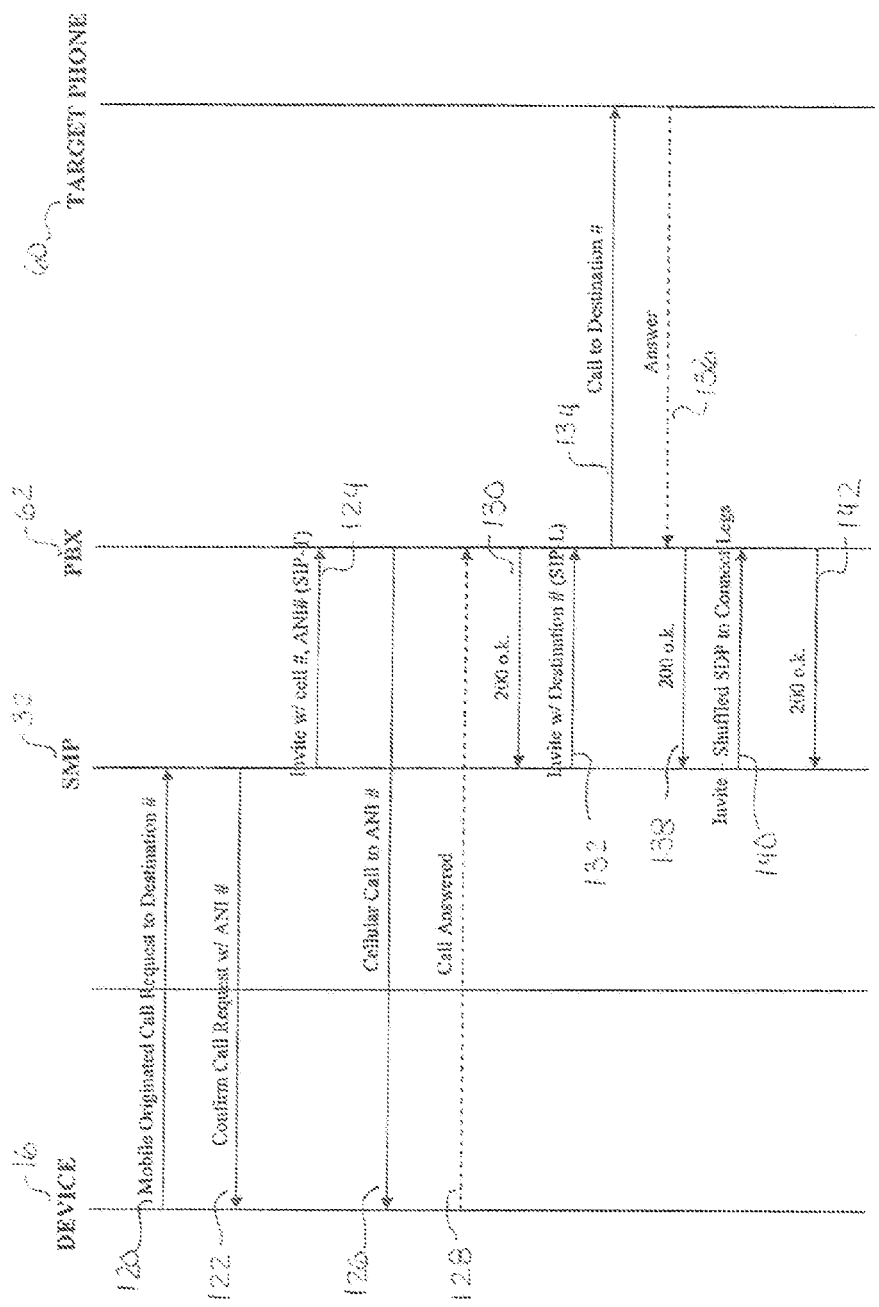
FIG. 2b is a signaling diagram generally indicating how mobile-originated, PBX-initiated, calls are processed by the network of FIG. 1.

The above description is known as a "mobile initiated" call, because the SMP 32 provides the mobile device 16 with the DNIS number into which the mobile device 16 has called. Alternatively, the mobile originated call could be "PBX initiated", as shown in FIG. 2B. Specifically, in a PBX-initiated call, upon receipt of the mobile originated call request (block 120), the SMP 32 confirms receipt of the call to the mobile device 16 with an ANI number (block 122), which the mobile device uses to identify the incoming call from the PBX 62. The PBX 62 then sends an invite over SIP-T to the PBX 62 with the cellular number of the device and the ANI number that is attached to the outgoing call (block 124). Upon receipt of the invite, the PBX 62 makes a cellular call to the device 16 (block 126), which is answered by the device (block 128). The device 16 checks the ANI number in the incoming call to confirm if the number is actually from the PBX 62. If the ANI number is stripped for any particular reason, then the device 16 may be configured to answer the call as a regular cellular call, or it may reject the call as unknown. When the device 16 answers the PBX-initiated call, the PBX 62 sends a 200 o.k. signal to the SMP 32, indicating that the call leg to the device is established (block 130).

In response, the SMP 32 sends an invite over SIP-L with the destination number of the target phone 60 to the PBX 62 (block 132). When the invite is received at the PBX 62, the PBX dials the destination number to the target phone 60 (block 134), the target phone picks up the call (block 136), and a 200 o.k. signal is sent from the PBX to the SMP 32 (block 138), indicating that the target phone is also ready to receive data. In response to the 200 o.k., the SMP 32 sends an invite to the PBX 62, shuffling the SDP to connect the call legs (block 140). Finally, when the call legs are connected, the PBX 62 sends a second 200 o.k. signal to the SMP 32, and the users of the device 16 and target phone 60 are able to communicate with each other.

In both instances, the SMP 32 is performing third party call control of the two call legs, the PBX 62 remaining in control of the call. The decision of whether to proceed with a mobile-initiated call or a PBX-initiated call can be set by policy. Specifically, the option to select either mobile-initiated or PBX-initiated calls is a feature provided in the SMP 32, and an administrator for the enterprise 12 can determine which setting to use. For example, in some cases it may be more cost effective for the corporation to utilize PBX-initiated calls rather than mobile-initiated calls, and vice versa. However, it is appreciated that the system 10 is not limited to the above processes.

Figure 3A:
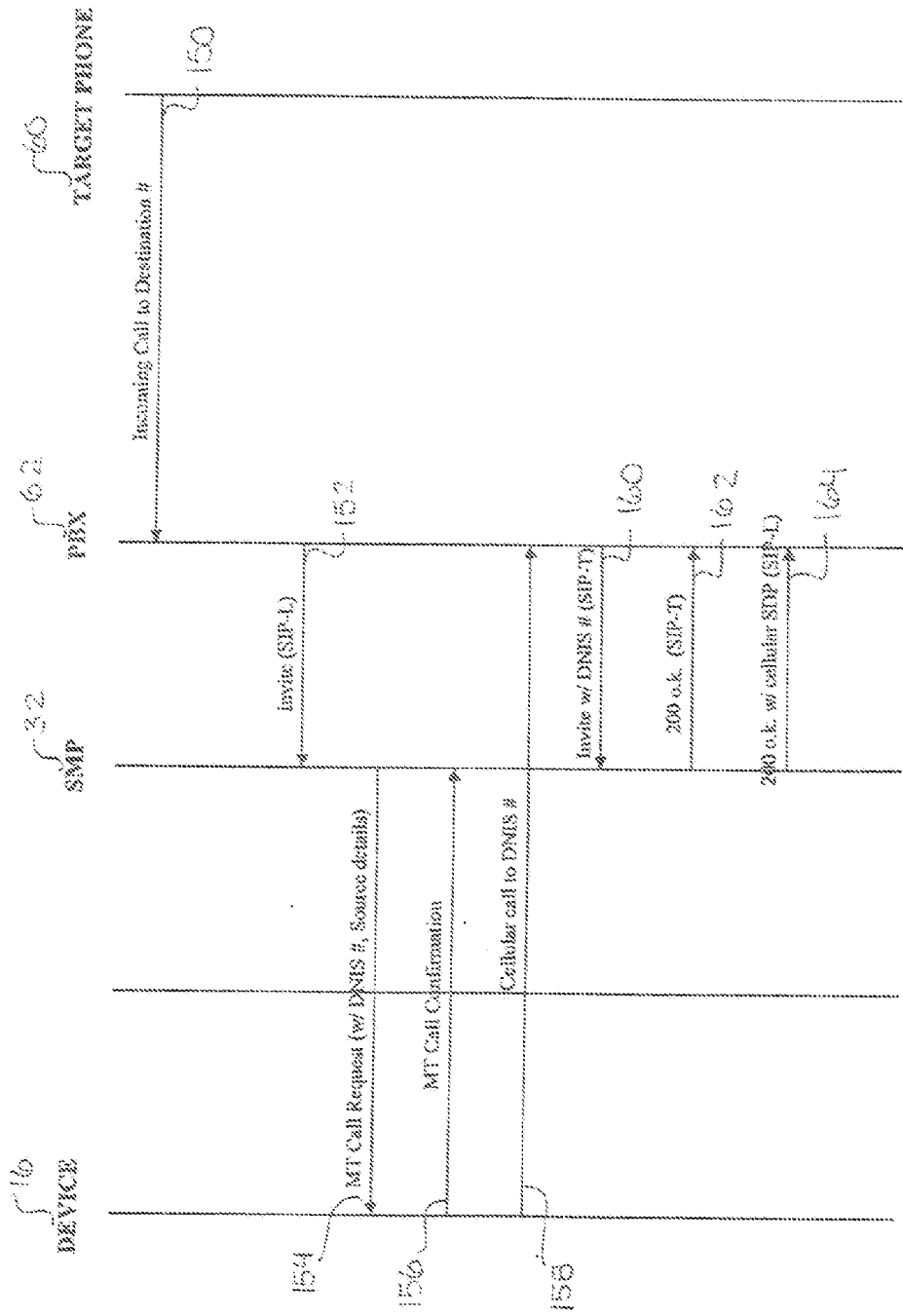
FIG. 3a is a signaling diagram generally indicating how mobile-terminated, mobile-initiated calls are processed by the network of FIG. 1.
Figure 3B:
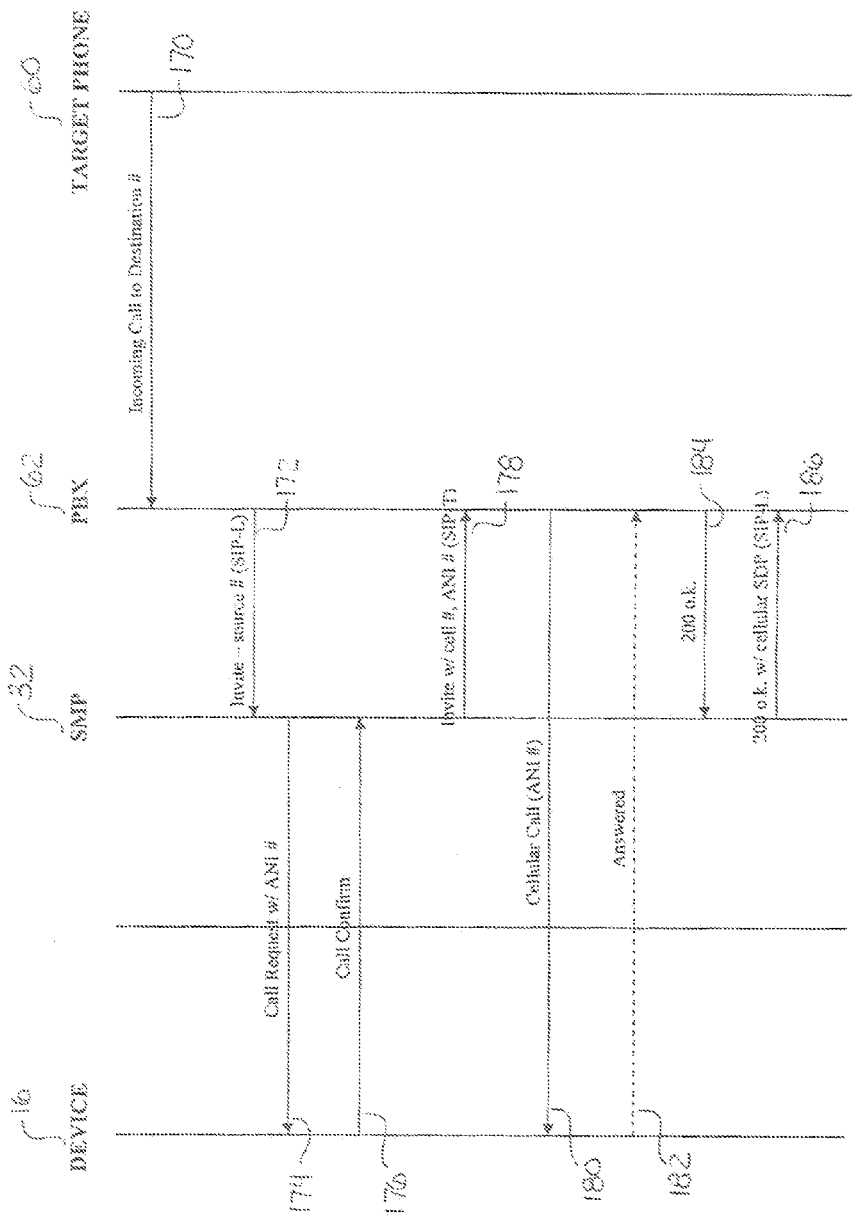
FIG. 3b is a signaling diagram generally indicating how mobile-terminated, PBX-initiated calls are processed by the network of FIG. 1.

FIGS. 3A and 3B are signaling diagrams illustrating a mobile terminated call utilizing SIP 40. Specifically, and for the purposes of this disclosure, the target phone 60 is originating the call, which will send a call to the mobile device. Turning first to FIG. 3A, an incoming call is made from the target phone 60 to the PBX 62 (block 150). When the call is received at the PBX 62, the PBX sends an invite to the SMP 32 over SIP-L (block 152).

In response to the invite, the SMP 32 sends a call request with the DNIS number and source details to the device 16 (block 154), which is confirmed to the SMP (block 156). In addition to confirming the call, the mobile device 16 sends a cellular call to the DNIS number at the PBX 62 (block 158). Again, as the DNIS number is routed in the dialing plans to the SMP 32, upon receipt of the cellular call, the PBX 62 sends an invite over SIP-T to the SMP 32 with the DNIS number (block 160). In response to the invite, a "200 o.k." signal is sent over SIP-T from the SMP 32 to the PBX 62, acknowledging that the call leg to the mobile device 16 is established (block 162). Finally, the initial invite (block 152) is acknowledged with the "200 o.k." signal with the cellular SDP, at which point the call legs are joined and the target phone 60 and device 16 can communicate with each other on the call.

The diagram shown in FIG. 3A illustrates a "mobile-initiated" call, because, as discussed above with respect to FIGS. 2A and 2B, the SMP 32 presents the mobile device 16 with the DNIS number at the PBX 62 into which to call. However, it is also possible to employ a "PBX-initiated" mobile terminated call, as shown in FIG. 3B, where the PBX 62 sends an incoming call to the device 16 with the ANI number of the target phone 60.

Specifically, similar to the mobile initiated call described above and shown in FIG. 3A, the target phone 60 sends an incoming call to the destination number of the device, which is received at the PBX 62 (block 170). Upon receipt of the call, the PBX 62 sends an invite over SIP-L to the SMP 32 (block 172) with the source number of the target phone 60. In response to the invite, the SMP 32 sends a call request with the source number to the device 16 (block 174), with the ANI number the device should expect in the incoming call, the call request being confirmed by the device (block 176). At this point in the PBX-initiated call, the SMP 32 sends an invite over SIP-T to the PBX with the cellular number and ANI number to use (block 178), prompting the PBX 62 to make a cellular call to the device 16 with the ANI number (block 180), prompting the device to ring. The device answers the call (block 182), and a "200 o.k." signal is sent from the PBX 62 to the SMP 32, acknowledging that the cellular call leg to the device 16 is established (block 184). In response, a "200 o.k." signal is also sent from the SMP 32 to the PBX 62, acknowledging that the call leg to the target phone 60 is also established (block 186). The SMP 32 shuffles the SDP to connect the call legs, the call legs are joined, and the target phone 60 and device 16 can communicate with each other on the call.

As discussed above with respect to FIGS. 2A and 2B, the SMP 32 remains in control of the signaling between the target phone 60 and the mobile device 16 in both the mobile-initiated and PBX-initiated calls. Again, the decision to proceed with a mobile-initiated call or a PBX-initiated call is based on policy and made by the administration of the organization. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Attention will now be turned to the operation of a conference services application 64, which enables multiple communication devices (including desk telephones and personal computers) to participate in a conference call through use of a centralized conference server 66. As seen in FIG. 1, the conference server 66 is provided in the enterprise 12 and is in communication with the conference services application 64 preferably through the SIP protocol 40, although it is recognized that additional protocols that control media separate from data may be appropriate, such as the Web Services protocol 42 or the CTI protocol 46. As will be described in further detail below, the conference call server 66 is configured for directing media and data streams to and from one or more communication devices (i.e., mobile devices 16, telephones 28, and computers 30).

Figure 4A:
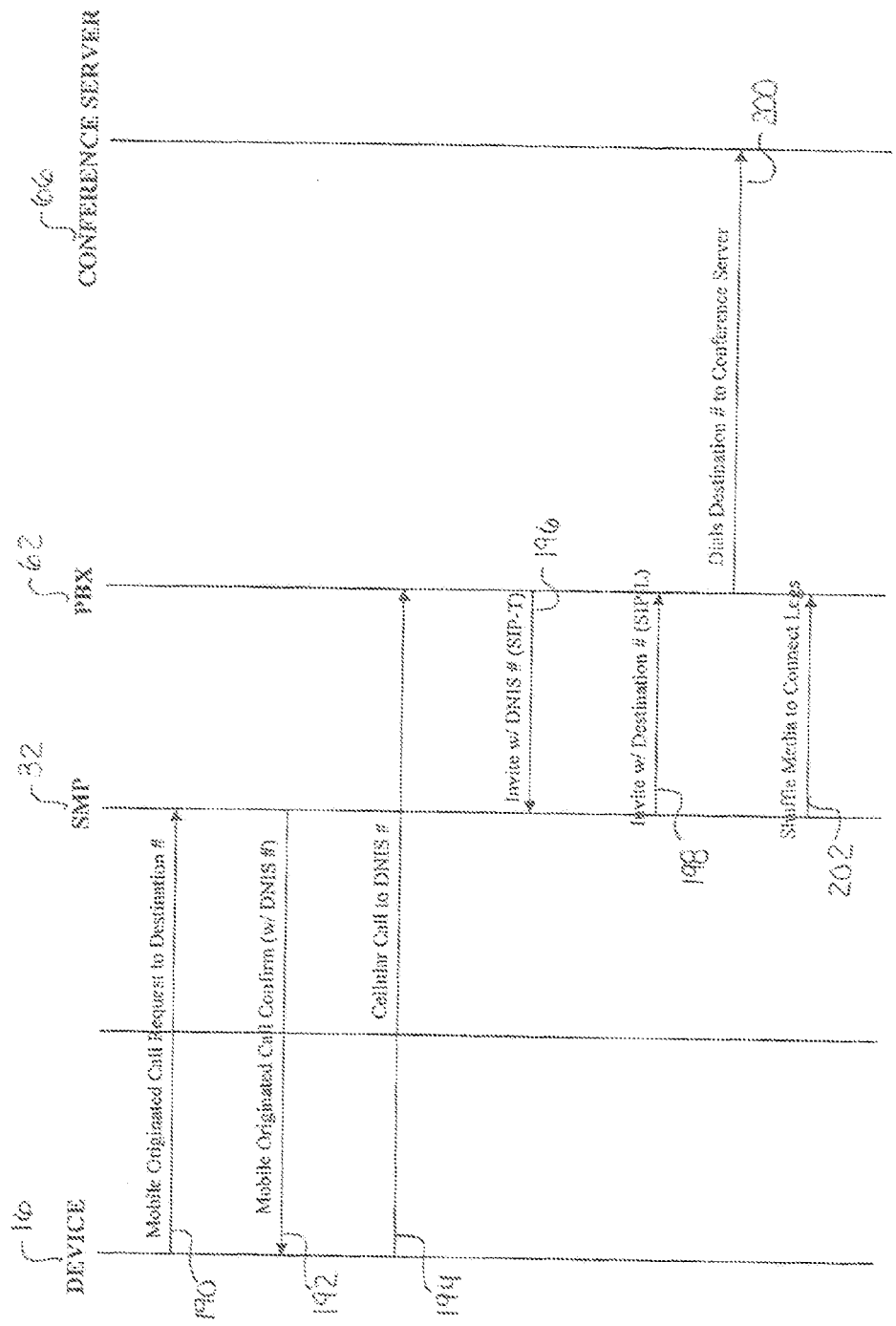
FIG. 4A is a signaling diagram generally indicating how mobile-originated, mobile-initiated conference calls are processed by the network of FIG. 1.

Turning now to FIGS. 4A-5B, the basic initiation of a conference call utilizing the SIP protocol 40 is provided. In FIG. 4A, the mobile device 16 joins the conference call at the appropriate time by calling a specified dial-in number and entering an access code, as known in the art. However, it is understood that other methods for joining a conference call are appropriate, and the present application is not limited to those options discussed herein. For example, the user of the mobile device 16 could access their calendar, select the scheduled conference call, and the device could automatically dial the appropriate number, without the need for an access code. Similarly, the user could receive an alert that the conference call is approaching, select an option to dial the appropriate number, and be joined to the conference call. Optionally, the user could access their email, find the conference call invite, and select the appropriate dial-in number for joining the conference call.

Specifically and as shown in FIG. 4A, at the designated time of the conference call, the mobile device 16 sends a call request to the SMP 32 (block 190), which the SMP confirms to the mobile device with the DNIS number (block 192). Upon receipt of the confirmation, the mobile device 16 sends a cellular call to the DNIS number, which is received at the PBX 62 (block 194). The PBX 62 then sends an invite over SIP-T associated with the DNIS number to the SMP 32 (block 196), which in response, sends an invite over SIP-L to the PBX with the destination number for the conference call (block 198). At this point, the PBX 62 dials the destination number to the conference server 66 (block 200), and the SMP 32 shuffles the media to connect the call legs (block 202). Once connected to the conference server 66, the user enters the access code into the mobile device (if applicable), enabling participation in the conference call.

Figure 4B:
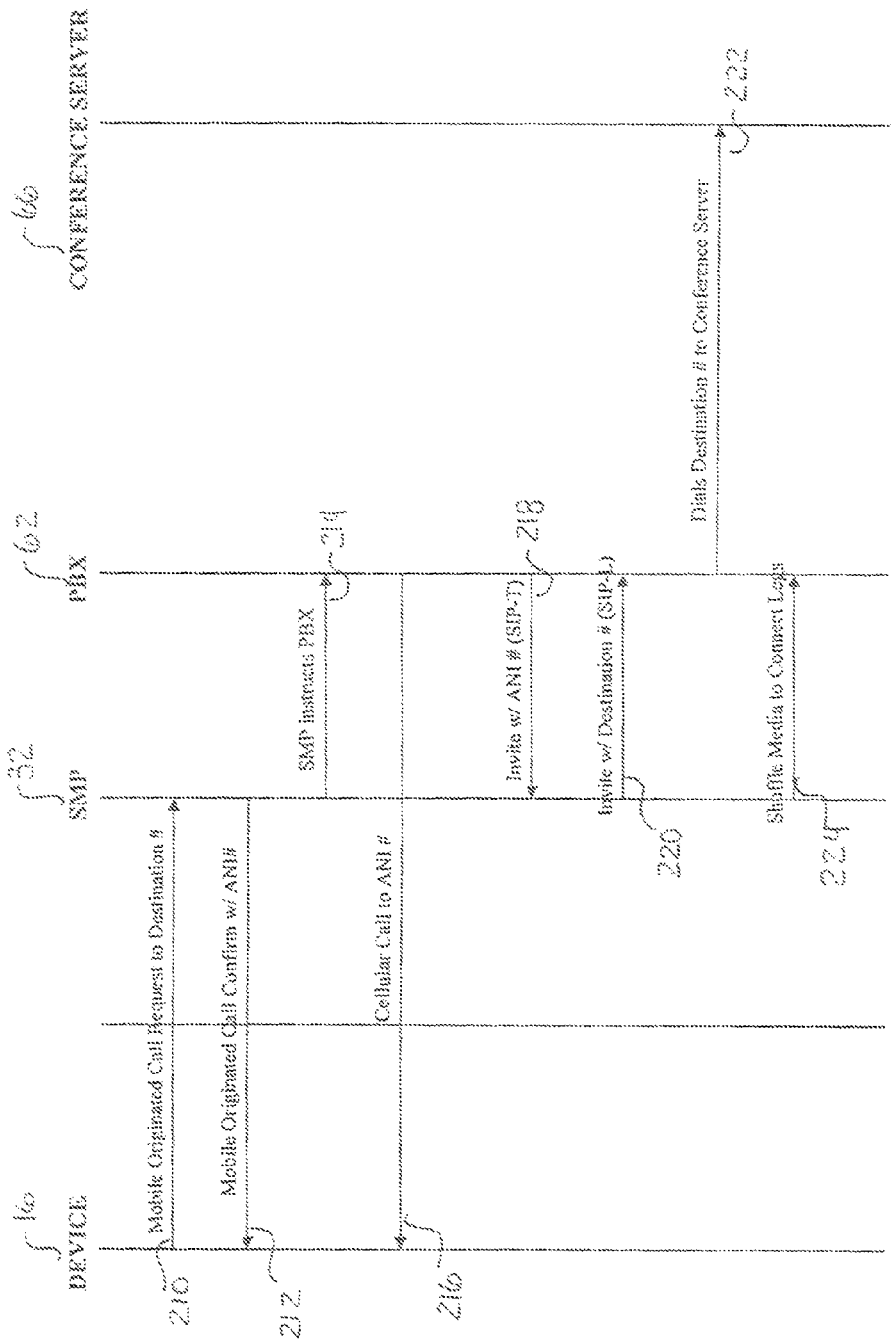
FIG. 4B is a signaling diagram generally indicating how mobile-originated, PBX-initiated conference calls are processed by the network of FIG. 1.

Similar to the mobile originated call described with respect to FIG. 2A, the mobile originated call in FIG. 4A is mobile-initiated, because the SMP 32 provides the mobile device 16 with a DNIS number at the PBX 32 into which to call. Accordingly, the mobile originated call to the conference server 66 can also be PBX-initiated, which is shown in FIG. 4B. Specifically, the mobile device 16 sends a call request to the destination number of the conference server 66, which is received at the SMP 32 (block 210). Upon receipt of the call request, the SMP 32 confirms the call request to the device 16 containing the expected ANI number of the call back (block 212) and instructs the PBX 62 (block 214) to send a cellular call with an appropriate ANI number of the device (block 216). The PBX 62 then sends an invite over SIP-T to the SMP 32 (block 218), and the SMP sends an invite back to the PBX over SIP-L with the destination number of the conference server 66 (block 220). The PBX 62 dials the destination number to the conference server 66 (block 222), at which point the SMP 32 shuffles the media to connect the call legs (block 224), enabling the device to participate in the conference call.

Figure 5A:
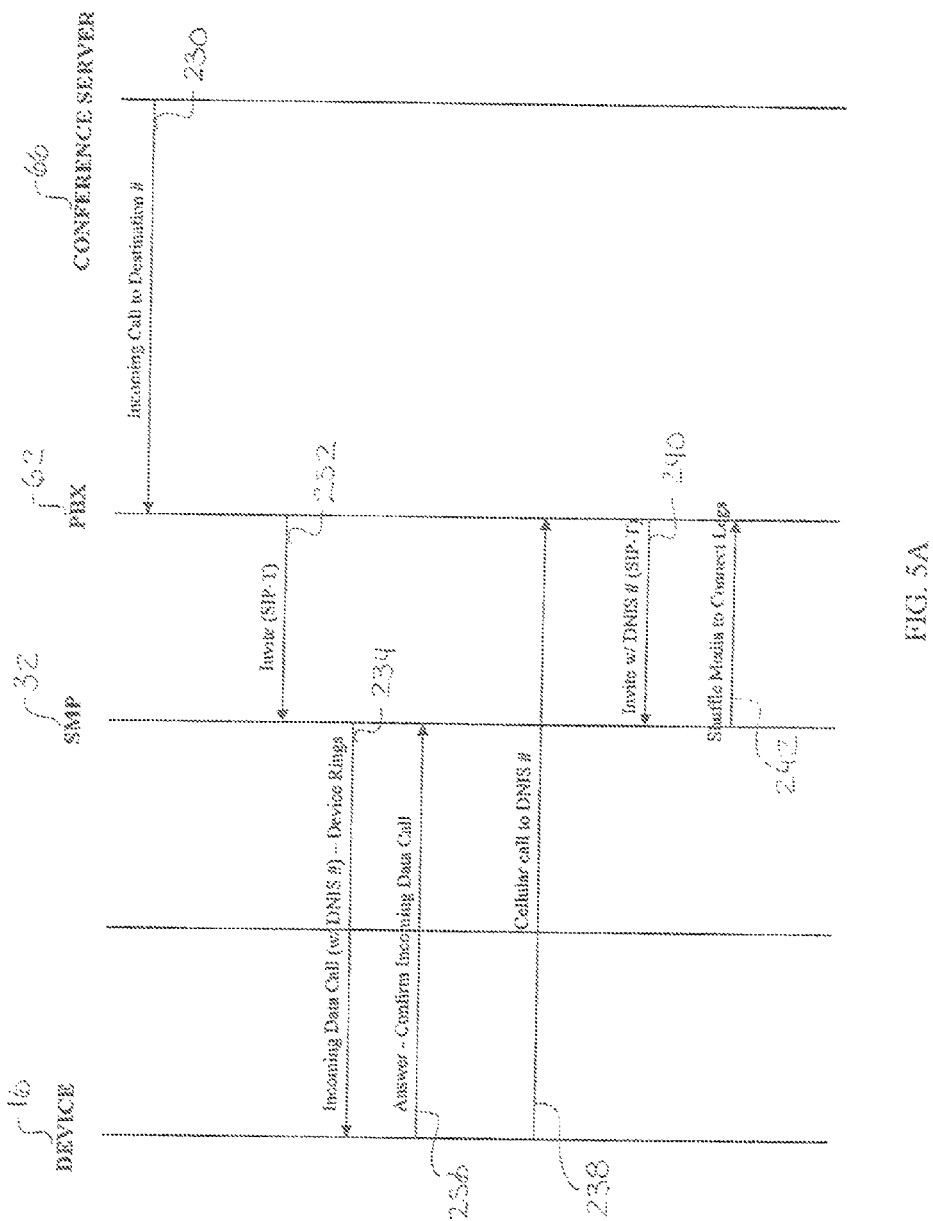
FIG. 5A is a signaling diagram generally indicating how a mobile-terminated, mobile initiated is used as part of a scheduled "fetch me" conference call processed by the network of FIG. 1.
Figure 5B:
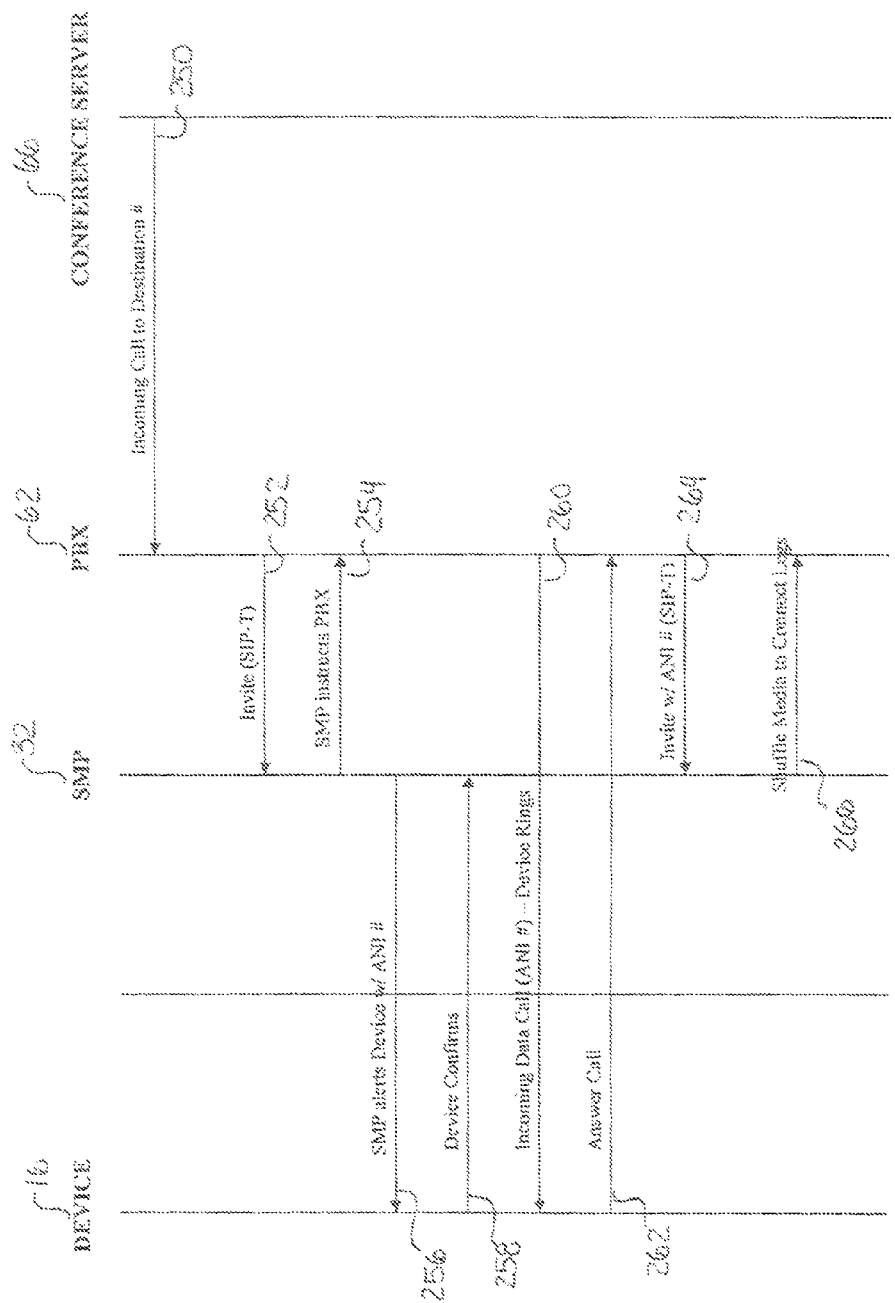
FIG. 5B is a signaling diagram generally indicating how a mobile-terminated, PBX-initiated call is used as part of a scheduled "fetch me" conference call processed by the network of FIG. 1.

Turning now to FIGS. 5A and 5B, it is also possible for the conference server 66 to "fetch" or bring the mobile device 16 into the conference call at the appropriate time. It is contemplated that this can happen in a variety of ways, and the present disclosure is not limited to those methods described herein. For example, the mobile device could have previously accepted an invitation to the conference call, of which the conference call server 66 makes note, calling the device at the appropriate time, as known in the art. Alternatively, the user of the mobile device 16 could, upon acceptance of the invitation, elect to be dialed into the conference call at the appropriate time, as also is known in the art. Such a "fetch" option may be beneficial to users who are unable to dial into the conference call at the desired time (i.e., they are driving), but still want to be included in the conference.

Specifically, and as seen in FIG. 5A, the conference server 66 sends an incoming call signal to the PBX 62 (block 230), which then sends an invite over SIP-T to the SMP 32 (block 232). Upon receipt of the invite, the SMP 32 sends an incoming data call to the mobile device 16 (block 234), causing the device to ring, and the call is confirmed/answered by the mobile device (block 236). The device 16 then makes a cellular call to the DNIS number, which is received at the PBX 62 (block 238). When the call is received, the PBX 62 sends an invite over SIP-T associated with the DNIS number to the SMP 32 (block 240). In response to the invite, the SMP 32 shuffles the media to connect the call legs (block 242), enabling the conference server 66 and device 16 to communicate with each other on the call.

FIG. 5A indicates a mobile-initiated call, because the device 16 calls into a DNIS number. Alternatively and as shown in FIG. 5B, the conference server originated call can also be PBX-initiated, where the SMP 32 causes the PBX 62 to call out to the device 16 with a known ANI number. Specifically, the conference server 66 sends an incoming call to the PBX (block 250), which then sends an invite over SIP-T to the SMP 32 (block 252). The SMP 32 alerts the device 16 that a call is expected over the data channel and provides the ANI number that the call will contain (block 254), the receipt of which the mobile device confirms (block 256). The SMP 32 then instructs the PBX (block 258) to send a call to the device 16 with the ANI number that is to be associated with the call back (block 260). The mobile device 16 answers the call (block 262), and the PBX 62 sends an invite over SIP-T to the SMP 32 (block 264), which then shuffles the media to connect the call legs, at which point the device 16 is connected into the conference call.

As mentioned above with respect to FIGS. 2A-3B, the decision to proceed with a mobile-initiated call versus a PBX-initiated call is a policy decision that is made by the administrator or someone within the organization. Further, although FIGS. 4A-5B discuss a mobile device 16 joining a conference call, it is appreciated that other communication devices may also be joined into the conference call, such as telephones 28 on the PSTN 24, computers 30, and the like. These communication devices would be joined to the conference call server 66 in the same manner as that described above with respect to the mobile device 16, and accordingly will not be described in further detail herein.

It may be further noted that the conference services may be network based outside the corporate environment as shown in FIG. 1. Furthermore, the present methods and systems are to some extent described in the context of a PBX, it is however understood that other telephony platforms may be used such as other premise, hosted or network based telephony platforms including OCS/LCS (Microsoft's live communication server/hosted office communication server), SIP proxies, centralized call processors H.248 transport/servers, and such like.

As mentioned earlier sometimes corporations may not want an employee or conference call participant to participate in a conference call unless they are in a secure location or on a secure device. As can be appreciated these security or access requirements can vary between organizations, users etc. Hence the present disclosure describes in one aspect a generalized approach to ensuring consistent application of access requirements within an organization.

Figure 6:
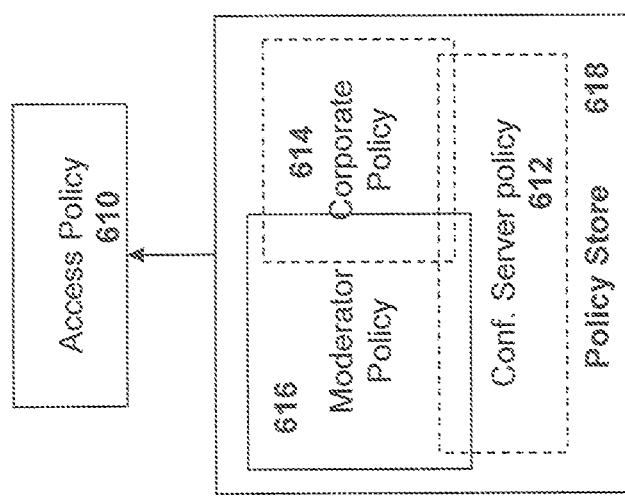
FIG. 6 is a schematic diagram of an access policy document.

Accordingly, referring to FIG. 6 there is shown one mechanism for implementing an access policy. An access policy document 610 is created which comprises a rule-set representing an entire 'composed policy' document for a conference call. The rule-set may consist of one or more rules, which specify conditions; such as context attributes (device state/capabilities, location, presence, etc.) may be applied to establish the applicable set of 'rules' or policy for a conference call. Note that as per IETF rfc-4745, section 10, it is possible to combine rules. This would allow rules to be combined in such a way to provide a policy, which is equivalent to the intersection of conference server policy 612, enterprise corporate policy 614, and moderator policy 616. In other words, the policy applied is the appropriate combining of the actions/transforms for matching rules (as defined in Section 10). The various policy documents may be made available through an appropriate policy store 618.

For illustration purposes an example policy document for a given moderator is shown below, which is implemented using RFC-4745 XML document.

```
<?xml version="1.0" encoding="UTF-8"?>
<cp:ruleset xmlns:cp="urn:ietf:params:xml:ns:common-policy"
    xmlns:ac="http://www.cc.com/ccserver"
    xmlns:xsi="http://www.w3.org/2001/XMLSchema-instance"
    xsi:schemaLocation="urn:ietf:params:xml:ns:common-policy
..\..\..\..\IETF\common-policy.xsd http://
www.cc.com/ccserver cc_ccserver.xsd">
    <!--
    -->
    <!--
    An example policy 'rule' for a given moderator'. This doc can also
incorporate corporate or 'conf-call admin' policy rules, which are combined
to enforce overall conf-call server 'behavior'. Below policy restricts
conference call participants to Bob and Ralph from XYZ Incorporated-->
    <cp:rule id="mod_brian_pol_rule1 ">
        <cp:conditions>
```

-continued

```
            <cp:identity>
                <cp:one id="sip:bob@example.com"/>
                <cp:one id="sip:ralph@example.com"/>
            </cp:identity>
            <cp:sphere value="XYZ Incorporated"/>
            <cp:validity>
                <cp:from>2009-02-20T08:00:00+08:00</cp:from>
                <cp:until>2009-02-20T17:00:00+08:00</cp:until>
            </cp:validity>
        </cp:conditions>
        <cp:actions>
            <!-- Specific conference call namespace for defining an "action" if
this rule matche. Action here is to allow.... -->
            <ac:allow reasonStr="candidate participant(s) permitted"/>
        </cp:actions>
        <!-- <cp:transformations/> is optional and may be used to transform
a
result (e.g. a response code) -->
    </cp:rule>
    <cp:rule id ="mod_brian_pol_rule2">
        <cp:conditions>
            <cp:identity>
                <cp:one id="sip:alice@example.com"/>
            </cp:identity>
            <cp:sphere value="XYZ Incorporated"/>
            <cp:validity>
                <cp:from>2009-02-20T08:00:00+08:00</cp:from>
                <cp:until>2009-02-20T17:00:00+08:00</cp:until>
            </cp:validity>
        </cp:conditions>
        <cp:actions>
            <!-- Action here is to block unconditionally... -->
            <ac:block reasonStr="candidate participant(s) blocked"/>
        </cp:actions>
    </cp:rule>
</cp:ruleset>
```

An example common policy document is shown below.

```
<?xml version="1.0" encoding="UTF-8"?>
<xs:schema targetNamespace="urn:ietf:params:xml:ns:common-policy"
    xmlns:cp="urn:ietf:params:xml:ns:common-policy"
    xmlns:xs="http://www.w3.org/2001/XMLSchema"
    elementFormDefault="qualified" attributeFormDefault="unqualified">
    <!-- /ruleset -->
    <xs:element name="ruleset">
        <xs:complexType>
            <xs:complexContent>
                <xs:restriction base="xs:anyType">
                    <xs:sequence>
                        <xs:element name="rule" type="cp:ruleType"
                            minOccurs="0" maxOccurs="unbounded"/>
                    </xs:sequence>
                </xs:restriction>
            </xs:complexContent>
        </xs:complexType>
    </xs:element>
    <!-- /ruleset/rule -->
    <xs:complexType name="ruleType">
        <xs:complexContent>
            <xs:restriction base="xs:anyType">
                <xs:sequence>
                    <xs:element name="conditions"
                        type="cp:conditionsType"minOccurs="0"/>
                    <xs:element name="actions"
                        type="cp:actionsType" minOccurs="0"/>
                    <xs:element name="transformations"
                        type="cp:transformationsType" minOccurs="0"/>
                </xs:sequence>
                <xs:attribute name="id" type="xs:ID" use="required"/>
            </xs:restriction>
        </xs:complexContent>
    </xs:complexType>
    <!-- //rule/conditions -->
    <xs:complexType name="conditionsType">
        <xs:complexContent>
```

```
            <xs:restriction base="xs:anyType">
                <xs:choice maxOccurs="unbounded">
                    <xs:element name="identity"
                        type="cp:identityType" minOccurs="0"/>
                    <xs:element name="sphere"
                        type="cp:sphereType" minOccurs="0"/>
                    <xs:element name="validity"
                        type="cp:validityType" minOccurs="0"/>
                    <xs:any namespace="##other" processContents="lax"
                        minOccurs="0" maxOccurs="unbounded"/>
                </xs:choice>
            </xs:restriction>
        </xs:complexContent>
    </xs:complexType>
    <!-- //conditions/identity -->
    <xs:complexType name="identityType">
        <xs:complexContent>
            <xs:restriction base="xs:anyType">
                <xs:choice minOccurs="1" maxOccurs="unbounded">
                    <xs:element name="one" type="cp:oneType"/>
                    <xs:element name="many" type="cp:manyType"/>
                    <xs:any namespace="##other" processContents="lax"/>
                </xs:choice>
            </xs:restriction>
        </xs:complexContent>
    </xs:complexType>
    <!-- //identity/one -->
    <xs:complexType name="oneType">
        <xs:complexContent>
            <xs:restriction base="xs:anyType">
                <xs:sequence>
                    <xs:any namespace="##other"
                        minOccurs="0" processContents="lax"/>
                </xs:sequence>
                <xs:attribute name="id"
                    type="xs:anyURI" use="required"/>
            </xs:restriction>
        </xs:complexContent>
    </xs:complexType>
    <!-- //identity/many -->
    <xs:complexType name="manyType">
        <xs:complexContent>
            <xs:restriction base="xs:anyType">
                <xs:choice minOccurs="0" maxOccurs="unbounded">
                    <xs:element name="except" type="cp:exceptType"/>
                    <xs:any namespace="##other"
                        minOccurs="0" processContents="lax"/>
                </xs:choice>
                <xs:attribute name="domain"
                    use="optional" type="xs:string"/>
            </xs:restriction>
        </xs:complexContent>
    </xs:complexType>
    <!-- //many/except -->
    <xs:complexType name="exceptType">
        <xs:attribute name="domain" type="xs:string" use="optional"/>
        <xs:attribute name="id" type="xs:anyURI" use="optional"/>
    </xs:complexType>
    <!-- //conditions/sphere -->
    <xs:complexType name="sphereType">
        <xs:complexContent>
            <xs:restriction base="xs:anyType">
                <xs:attribute name="value"
                    type="xs:string" use="required"/>
            </xs:restriction>
        </xs:complexContent>
    </xs:complexType>
    <!-- //conditions/validity -->
    <xs:complexType name="validityType">
        <xs:complexContent>
            <xs:restriction base="xs:anyType">
                <xs:sequence minOccurs="1" maxOccurs="unbounded">
                    <xs:element name="from" type="xs:dateTime"/>
                    <xs:element name="until" type="xs:dateTime"/>
                </xs:sequence>
            </xs:restriction>
        </xs:complexContent>
    </xs:complexType>
    <!-- //rule/actions -->
    <xs:complexType name="actionsType">
        <xs:complexContent>
            <xs:restriction base="xs:anyType">
                <xs:sequence>
                    <xs:any namespace="##other" processContents="lax"
                        minOccurs="0" maxOccurs="unbounded"/>
                </xs:sequence>
            </xs:restriction>
        </xs:complexContent>
    </xs:complexType>
    <!-- //rule/transformations -->
    <xs:complexType name="transformationsType">
        <xs:complexContent>
            <xs:restriction base="xs:anyType">
                <xs:sequence>
                    <xs:any namespace="##other" processContents="lax"
                        minOccurs="0" maxOccurs="unbounded"/>
                </xs:sequence>
            </xs:restriction>
        </xs:complexContent>
    </xs:complexType>
</xs:schema>
```

Finally, an example conference call server policy document is shown below.

```
<?xml version="1.0"?>
<xsd:schema xmlns:xsd="http://www.w3.org/2001/XMLSchema"
        targetNamespace="http://www.cc.com/ccserver"
        xmlns="http://www.cc.com/ccserver"
        elementFormDefault="qualified">
    <xsd:import namespace="http://www.w3.org/XML/1998/namespace"
        schemaLocation="http://www.w3.org/2001/xml.xsd"/>
    <!--
        This particular schema provides (conference call)CC-Server specific
conditions, actions and transform
        XMLSchema definitions on behalf of a CC-Server policy.
    -->
    <xsd:attributeGroup name="cc.ccserver.attributes">
        <xsd:attribute name="reasonStr" type="xsd:string"/>
    </xsd:attributeGroup>
    <xsd:complexType name="actionElementType">
        <xsd:attributeGroup ref="cc.ccserverattributes"/>
    </xsd:complexType>
    <xsd:element name="block" type="actionElementType"/>
    <xsd:element name="block-conditional" type="actionElementType"/>
    <xsd:element name="allow" type="actionElementType"/>
    <xsd:element name="allow-conditional" type="actionElementType"/>
</xsd:schema>
```

The above is only an example of how policy could be achieved. Other mechanisms such as 'attribute masks' may also be applied to derive appropriate policy on behalf of a 'proposed candidate' conference participant, in order to qualify/disqualify them from actually participating in a conference call.

Figure 7:
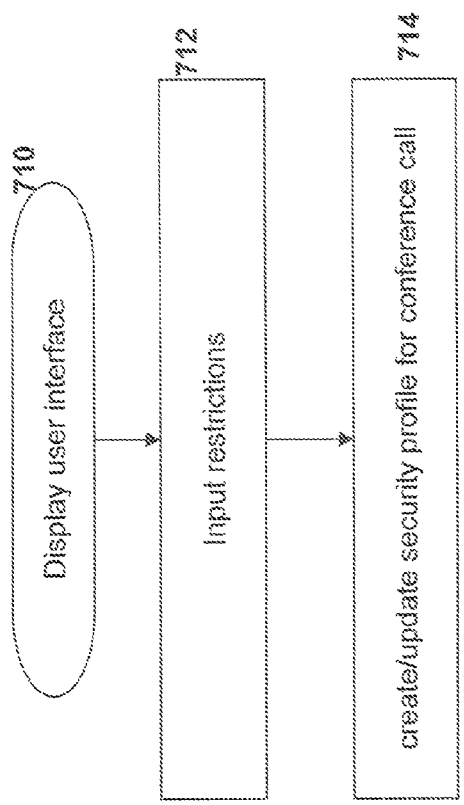
FIG. 7 is a flow diagram showing creating an access policy document.

Referring now to FIG. 7, there is shown a flow diagram of an exemplary method for creating/modifying the policy documents. At step 710 a user interface is displayed (in a manner known in the art) for a moderator to enter or modify access requirements in the policy document 610. This can be done for the organization as a whole or on a case-by case basis for conference calls. At step 712 restrictions as deemed appropriate are input and at step 714 the appropriate policy document is created or updated. Identification may also be included with the policy document to the conference call for later auditing or logging purposes. The restrictions created in step 712 could also be transformed into policy or policy document in step 714.

Figure 8:
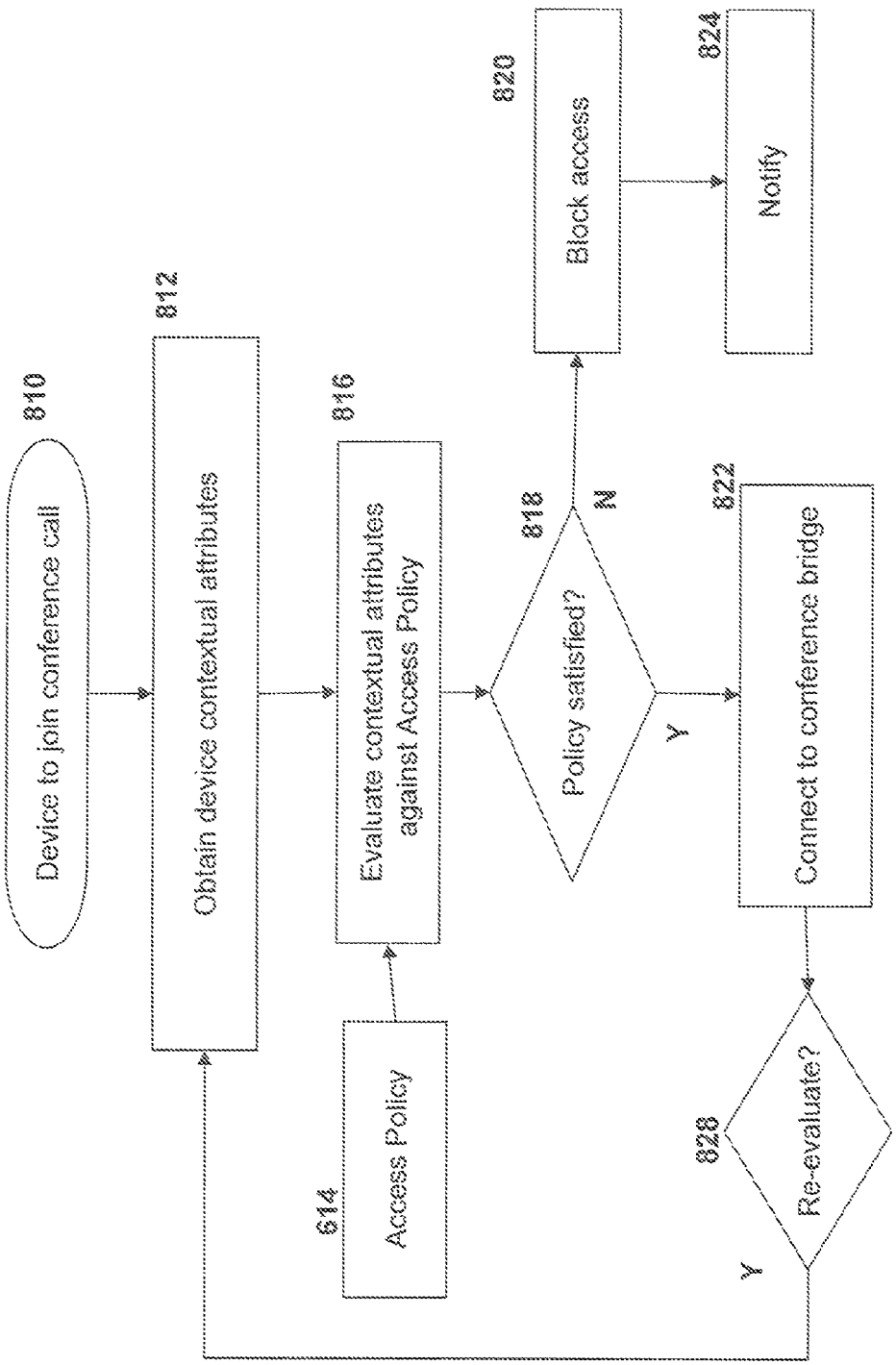
FIG. 8 is a flow diagram showing a method for securing access to a conference call in accordance with the present disclosure.

Referring, now to FIG. 8, there is shown a flow diagram of an exemplary method for providing improved security for conference calls, which is implemented on the conference platform of the present disclosure. The method can be included as part of the functionality of the conference services application 64 in the SMP, the conference server 66 or both. Beginning in step 810, a signal is received from a communication device seeking to participate in a conference call. This could be as a result of a device-initiated request, conference server request, PBX request, SMP request or even a fetch by a moderator or participant. At a next step 812 the system obtains appropriate contextual attributes for the requesting device. These attributes may be sent automatically by the device when it attempts to connect to the conference or may be requested by the conference system. In some cases the SMP may be able to auto-authenticate certain devices. Moreover, the presence server could be used to aid in establishing the state and/or device capabilities of the device and or the user to provide contextual attributes of the device. In the case of location information the conference server or policy evaluation mechanism could request location information from a location server. Further, the conference server may act in the role of a watcher and subscribe/fetch the state of a potential conference participant.

At a step 816 the process evaluates these attributes against the access requirements set in the access policy document 814 in FIG. 6. Depending on the restrictions set by the access policy document, the appropriate contextual attributes may include such things as the location of the device, an identification of the type of device, if there is a limit on the type of device that can be used to participate in a conference call or the type of peripherals used by the terminal. In some instance these attributes may be a combination of attributes, for example, if a conference call participant is not in the office or at home, restrictions could be placed such that they can only participate in the conference call if they use a device with a headset attached. Using the speakerphone on the device would not be allowed because it is not secure. Restrictions could also be applied to the type of peripherals used by the terminal. For example, a Bluetooth™ headset may not be considered secure enough when the device is not within the corporate campus, so only a wired headset is allowed in this circumstance. As mentioned with reference to FIG. 6 the access policy 614 may be a join or overlay of different policies retrieved from a policy store, which may be located conveniently within the enterprise or business system 12.

At step 818 a determination is made as to whether the policy is satisfied. A No determination by step 818 results in a failed security determination and denial of access 820 to the conference call for the caller. A YES determination at step 818 causes the caller to be granted access 822. The system may implement a variety of actions at step 822 to notify the device of the denial of access, notify the user or do nothing.

Still further, at step 828 the devices may be reevaluated against the policy to ensure that the policy is maintained during the call.

In a further embodiment, the presence server could operate with the location/positioning platform by initiating positioning requests for a given communication device. When the device calls to join the conference, the presence server can determine if the device is in an appropriate place to be connected to the call.

Accordingly the present matter implements a system that limits the type of device that can be used to participate in a conference call, and also base the limitation on the location of the device.

In a still further embodiment of the disclosure, a conference call can be set to have a specific security restriction such as restricting the location, including the surroundings of the device being used for the call. For example, a communication device having functionality to sense other devices can be used for a conference call. In this case the communication device can sense if other communication devices (such as Bluetooth™ enabled mobile phones) are within its proximity and has the comparable configurable communication methods available to be used. As mentioned before the presence server can capture the sate of a device associated with a place, e.g. Conference bridge room or user. In some cases a client application on the device can process presence information or other information to derive that an invalid device is in its proximity. If so, the device can refuse to connect to the call, or can restrict the use of its speakerphone. If the communication device is using speakerphone on the conference call, then as the other devices enter the room or its proximity, the communication device attached to the conference call senses them. Alternatively the conference server could do this as noted earlier.

A prompt or notification may be sent to the conference call moderator. The owner of these sensed devices could be validated against a list of call invitees, such that if they are not on the invitee list, the conference call is placed on hold until the user of the other device is registered as a participant or they leave the room. Alternatively, the moderator could be notified via an announcement. The moderator could then verbally suspend discussion in order to allow the unauthorized user to leave.

Furthermore, the call can be restricted if certain devices are not within the proximity of the communication device attached to the call. For example, if a participant has an identification (id) badge, which is remotely detectable, when the id badge is in close proximity to the communication device, the device will connect to the conference call—if the participant walks away from the device or the id badge is out of proximity from the device, the call is dropped or put on hold until the proximity condition is met.

In the case where the badge may be misplaced or stolen, it may be possible for the conference call user to navigate to a web site to authenticate, and receive a one-time key (which they must enter along with their individual password) to gain entry to the conference call. If the person is unable to unlock their device, it is possible they could initiate an "Emergency call function" to call a conference call-service number. This service number (after authenticating the user) could perhaps send an unlock code (via the Relay or through some other mechanism) to the device to unlock it (at which time the conference call user must re-apply a device specific lock password). The user could then use the web service to obtain the conference code key (based on conference details/authorization provided) and follow the steps previously mentioned.

Similarly for low security calls, as individuals enter a room their identity is immediately added to the moderator's list of call participants. Similarly, as the leave the room, their status is updated on the moderator's list.

Figure 9:
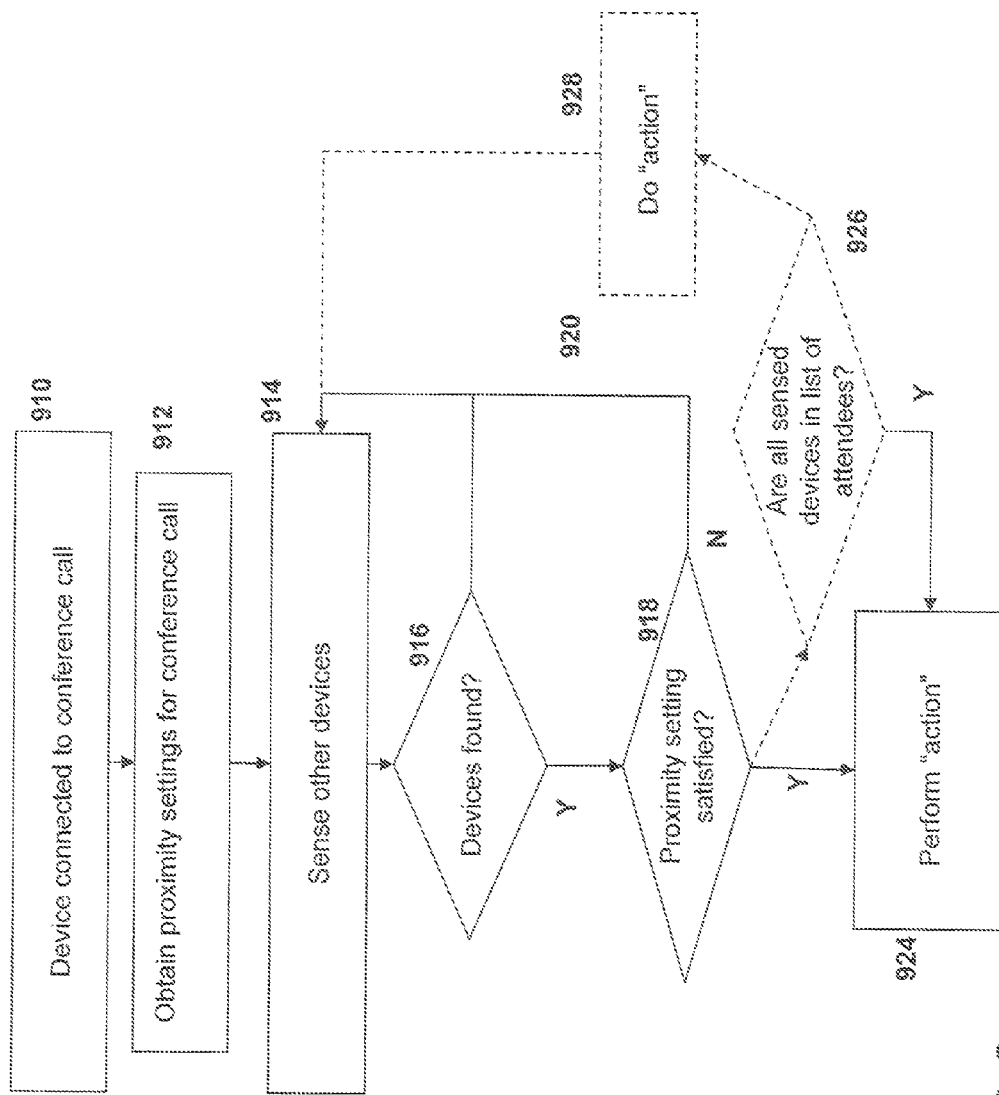
FIG. 9 is a flow diagram showing a method for managing conference call participation based on proximity of devices.

Referring now to FIG. 9, there is shown a flow diagram of an exemplary method for managing conference call participation based on proximity of devices. At step 910 a communication device is connected to the conference call. It is assumed that the connected device has the functionality to detect the presence of other devices, such as other communication devices or short-range communication devices as such as blue tooth enabled devices etc. Alternatively it is assumed that the conference server or some other service is able to provide this information. At step 912 the connected device obtains proximity settings (requirements) for the conference call). These setting may be determined by the conference moderator or by corporate policy and may be included in the policy document described earlier. At step 914 other devices in proximity to the connected device are sensed, in a manner as described earlier. If at step 916 devices are found the proximity of these devices are evaluated against the proximity settings at step 918. If the sensed devices satisfy the proximity settings at step 918 then the connected device can take appropriate action 924. For example these actions may include the device refusing to connect to the conference call (or dropping the connection), placing the call on hold or muting a speakerphone. These actions can be easily defined in an action section of the policy document.

Still further the connected device may notify the moderator or provide a list of the sensed devices to a moderator. It is usually a requirement that participants can only join a call once the moderator has established the conference call.

Additionally, depending on the security requirements the device may validate the sensed devices against a list of call invitees. If one or more of the senses devices are not on the invitee list then one or more of the actions above may be undertaken. Alternatively the device may place the call on hold until the user of the other device is registered as a participant or they leave the room (based on the proximity settings).

Conversely, the conference call can be restricted if certain devices are not within the proximity of the connected device, as shown in additional steps 926 and 928. In this case too an action can be defined by the policy document.

Finally, a log of who was present and at what time they entered/left the room (proximity) could be retained for meeting minutes/legal purposes, if applicable. This log or journal may also capture the policy evaluation steps performed by the conference call server for the duration of a given call.

As mentioned the proximity settings may also be specified in the policy document described above. For example the "content" or sub-elements of condition/action/transformations may differ, e.g. a condition may be based on location (i.e. location="work").

While a particular embodiment of the present method and system for directing communication streams has been described herein, it will be appreciated by those skilled in the art that changes and modifications may be made thereto without departing from the disclosure in its broadest aspects and as set forth in the following claims.

The invention claimed is:

1. A method for controlling access to a conference call managed by a server device, the method comprising:
   receiving a request from a communication device for access to the conference call;
   obtaining one or more contextual attributes associated with the communication device, the contextual attributes indicating at least one or more peripheral devices communicatively coupled to the communication devices;
   determining whether the contextual attributes of the communication device satisfy a predefined policy; and
   if the contextual attributes of the communication device fail to satisfy the predefined policy, updating operations of the server device to restrict the communication device's access to the conference call.

2. The method as defined in claim 1, wherein the determining whether the contextual attributes of the communication device satisfy the predefined policy comprises at least one of:
   determining whether a location of the communication device is within allowed locations predefined in the policy;
   determining whether a type of the communication device is within allowed types of devices predefined in the policy; or
   determining whether the one or more peripheral devices are within allowed peripherals predefined in the policy.

3. The method as defined in claim 1, the updated operations including refusing to connect the communication device to the conference call.

4. The method as defined in claim 1, the updated operations including restricting use of a speakerphone on the communication device.

5. The method as defined in claim 1, the updated operations including restricting use of a wireless headset on the communication device.

6. The method as defined in claim 1, further comprising: if the one or more contextual attributes of the communication device satisfy the predefined policy,
   allowing the communication device to access the conference call; and
   re-determining whether the contextual attributes of the communication device satisfy the predefined policy during the conference call.

7. The method as defined in claim 1, wherein the controlling access is performed by a conference call platform.

8. The method as defined in claim 1, wherein the location of the communication device is provided by a location server.

9. A server device for controlling access of a communication device to a conference call, the server device comprising:
   a processor configured to:
   receive a request from the communication device for access to the conference call;
   obtain one or more contextual attributes associated with the communication device, the contextual attributes indicating at least or more peripheral devices communicatively coupled to the communication devices;
   determine whether the contextual attributes of the communication device satisfy a predefined policy; and
   if the contextual attributes of the communication device fail to satisfy the predefined policy, determine an action restricting the communication device's access to the conference call.

10. The server device as defined in claim 9, wherein the processor is configured determine whether the contextual attributes of the communication device satisfy the predefined policy comprises at least one of:
   determine whether a location of the communication device is within allowed locations predefined in the policy;
   determine whether a type of the communication device is within allowed types of devices predefined in the policy; or
   determine whether the one or more peripheral devices are within allowed peripherals predefined in the policy.

11. The server device as defined in claim 9, the action including the refusal to connect the communication device to the conference call.

12. The server device as defined in claim 9, the action including the restricting of use of a speakerphone on the communication device.

13. The server device as defined in claim 9, the action including the restricting of use of a wireless headset on the communication device.

14. The server device as defined in claim 9, if the one or more contextual attributes of the communication device satisfy the predefined policy, the processor is further configured to:
   allow the communication device to access the conference call; and
   re-determine whether the contextual attributes of the communication device satisfy the predefined policy during the conference call.

15. The server device as defined in claim 9, wherein the controlling of access is performed by a conference call platform.

16. The server device as defined in claim 9, wherein the location of the communication device is provided by a location server.

17. A non-transitory computer readable storage medium storing instructions that are executable by one or more processors of a server device to cause the server device to perform a method for controlling access of a communication device to a conference call, the method comprising:
   receiving a request from a communication device for access to the conference call;
   obtaining one or more contextual attributes associated with the communication device, the contextual attributes indicating at least one or more peripheral devices communicatively coupled to the communication devices;
   determining whether the contextual attributes of the communication device satisfy a predefined policy; and
   if the contextual attributes of the communication device fail to satisfy the predefined policy, determining an action restricting the communication device's access to the conference call.

18. The computer readable storage medium of claim 17, wherein the determining whether the contextual attributes of the communication device satisfy the predefined policy comprises at least one of:
   determining whether a location of the communication device is within allowed locations predefined in the policy;
   determining whether a type of the communication device is within allowed types of devices predefined in the policy; or
   determining whether the one or more peripheral devices are within allowed peripherals predefined in the policy.

19. The computer readable storage medium of claim 17, the action including refusing to connect the communication device to the conference call.

20. The computer readable storage medium of claim 17, the action including restricting use of a speakerphone on the communication device.

21. The computer readable storage medium of claim 17, the action including restricting use of a wireless headset on the communication device.

22. The computer readable storage medium of claim 17, further comprising: if the one or more contextual attributes of the communication device satisfy the predefined policy,
   allowing the communication device to access the conference call; and
   re-determining whether the contextual attributes of the communication device satisfy the predefined policy during the conference call.

23. The computer readable storage medium of claim 17, wherein the controlling access is performed by a conference call platform.

24. The computer readable storage medium of claim 17, wherein the location of the communication device is provided by a location server.

* * * * *